Dec. 17, 1929.   J. D. BOLENDER   1,739,943
MOLDING
Filed Feb. 7, 1928
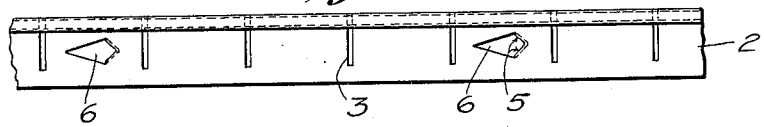
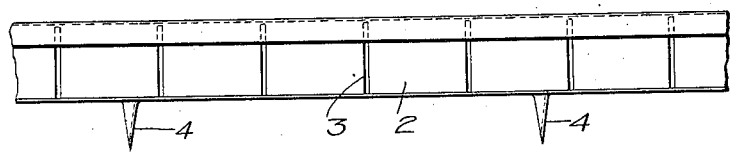
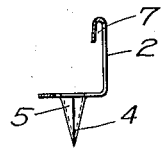
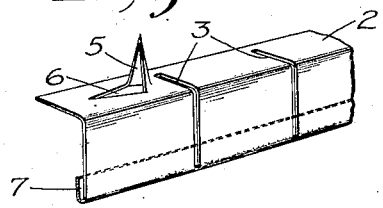
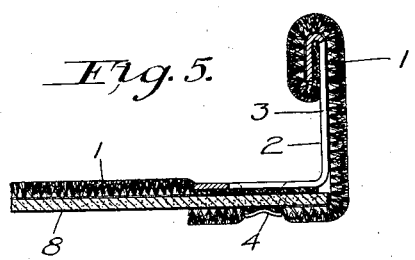
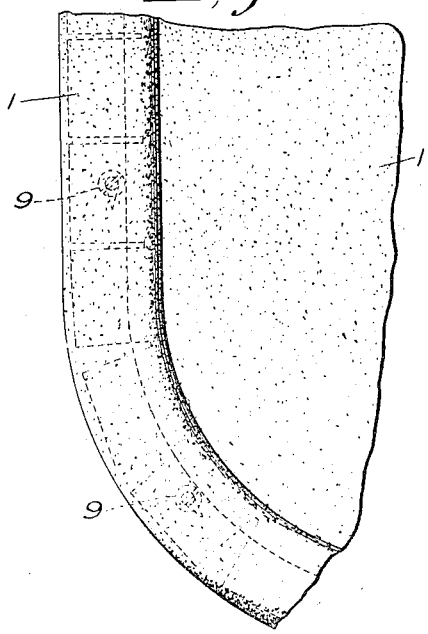
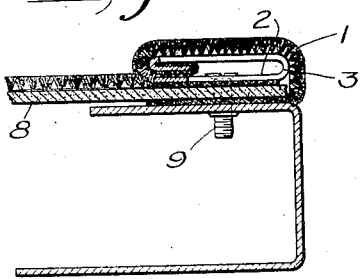
Inventor
Joel D. Bolender
By Attorneys
Nathan & Bowman Patented Dec. 17, 1929

1,739,943

UNITED STATES PATENT OFFICE

JOEL D. BOLENDER, OF CONNERSVILLE, INDIANA, ASSIGNOR TO THE GEORGE R. CARTER COMPANY, OF CONNERSVILLE, INDIANA, A CORPORATION OF INDIANA

MOLDING

Application filed February 7, 1928. Serial No. 252,495.

This invention relates to improvements in molding for upholstering wherein the attaching devices are concealed. It relates more particularly to upholstering for metal door and body frames, and as at the present time automobile makers have developed the use of steel doors and bodies in their automobile construction, it is essential that the molding should be capable of being fastened to the metal frame of the door or body of the car, as well as to wooden structures. This improvement is of the same general type as that described in Letters Patent No. 1,387,639 issued August 16, 1921, which was intended for use with wooden structures and in that Letters Patent there is shown a stiffening device of an extremely flexible character which has proved to be suited to the exigencies of a situation demanding that the molding be secured to the upholstery in its unfolded condition and bendable about corners and curves and after being attached to a wooden frame, it can be readily folded into a position to conceal the attaching means.

But great difficulty has arisen where the molding has to be attached to a metal frame. The problem was to devise such a foldable construction that the parts could be readily assembled, bent around corners and curves, be secured by screws or bolts to the metal frame and thereafter folded together to conceal the heads of the screws or bolts, and at the same time the upholstery material would be held securely and smoothly, while the molding was being bent about corners and curves. When finally secured to the metal frame, the structure must be such that the sides can be folded to conceal the attaching devices, while at the same time the upholstery must retain its smooth appearing effect.

In devising this improvement adapted to metal frames, there has been developed means for stiffening the upholstery and of sufficient flexibility to meet all the exigencies mentioned above, and at the same time the stiffening device has within itself devices for holding the upholstery securely and properly in unfolded assembly position while the entire structure is being applied to the metal frame, and this holding device is specially re-inforced for its intended work and in the forming of same for the stiffening device there are simultaneously formed openings of proper character for the screws or bolts for attaching to the metal frame, and these openings may be spaced a predetermined distance apart, in order to have them register with similar openings, correspondingly spaced apart in the metal frame. This new molding can be attached to a wooden as well as a steel frame.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

In the drawings Figure 1 is a plan view of the stiffening member; Fig. 2 is a side elevation thereof; Fig. 3 is a detail view of the member turned bottom up; Fig. 4 is a transverse sectional view; Fig. 5 is a sectional view of the device in unfolded position; Fig. 6 is an end view showing the parts in folded position; Fig. 7 is a detail view of the metal frame showing the screws.

The molding is composed of the upholstery material marked 1 and the stiffening member marked 2. This stiffening member is preferably formed of tin of such character as to have some flexibility and the cross slits 3 preferably extend from the edge towards the center thereof, in order to increase the flexibility of the member and make it adapted to the bending on curves and around corners. From the central portion of said member 2 there are punched a plurality of prongs 4 preferably formed with angular surfaces 5 extending from the base to the point thereof in order to re-inforce same for their intended purpose. As clearly seen in Fig. 3 these prongs are re-inforced by having the sides formed in angular relation, one to the other, the interior of the prong having almost a concave surface, while the exterior surface is formed on a curve having the effect of a convex surface, and this angular formation of the prong re-inforces it from the base to the point thereof and makes it especially adapted to the penetration of the upholstery and other material, since the prong cannot be easily deflected in any direction. The shape and size of the prong is designed with the view of forming, simultaneously with the punching process, openings of a shape suitable for the insertion of screws. These openings are designated 6.

The method of application of this molding is to secure one edge of the upholstering material within the groove or channel 7 formed by bending one edge of the stiffening member and by forcing the sides of said groove together; the edge of the said material will be securely held within the groove or channel. A piece of card board 8 is preferably placed against the inside surface of the upholstering material and the points of the prongs are then forced through the card board and upholstery and the ends clinched, thereby securely fastening the card board and upholstery material together, and in this operation it is easy to keep the upholstery smooth and unwrinkled and the card board will be concealed between the metal frame and the upholstery material. In this way the parts are properly assembled, ready to be applied to the metal frame with the sides of the stiffening device in their unfolded position (see Fig. 5). It is apparent that the angular shaped prongs are especially adapted for the securing together of heavy material, such as card board and heavy upholstery material.

The slitted metal member can be readily bent into the necessary shapes and forms to enable the edge of the upholstery to fit corners and curves formed in the metal frame. The openings 6 adjacent the prongs are made to register with openings formed in the sheet metal frame and screws 9 are inserted in said openings for securely fastening the molding to the metal frame. Thereafter the sides of the slitted metal stiffening member are folded to close the central space thereby concealing the fastening devices. In some kinds of moldings the slits formed in the stiffening device can be omitted—this is especially true of moldings or straight work, where no curves or corners are met with.

In case punching jigs are used in the manufacture of steel doors for punching the holes for the screws, trimming jigs could be used to correspond with the punching jigs so that predetermined and equally spaced openings can be formed in the molding and in the metal door frame of such character that they will be found to register, when the molding is applied to the frame.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. An article of manufacture comprising a metal body frame, a molding of fabric having foldable sides, a metal member within the molding, said metal member being formed with angularly shaped projecting prongs near the center thereof penetrating the molding, and having a channel formed on one edge thereof, the edge of the molding being secured therein, the said assembled molding and metal member being adapted to be secured to said metal body frame, while in unfolded position.

2. In a device of the character described the combination of a metal frame with a molding of fabric having foldable sides, a stiffening member inserted within the fabric, having prongs punched from said stiffening member, whereby openings are left adjacent said prongs, the metal frame having openings that register with said first mentioned openings, fastening elements passing through said openings, and said stiffening member being of such flexible character as to permit it to be bent along its longitudinal axis for bringing the foldable sides of the molding into folded position thereby concealing said openings.

3. An article of manufacture comprising a metal frame, a metal stiffening member having vertical and horizontal flanges, prongs punched from one of the flanges, leaving punched openings adjacent thereto, said metal frame being formed with screw threaded openings registering with the punched openings, a molding of fabric enveloping said stiffening member penetrated by said prongs and screws extending through the punched openings into said screw threaded openings, the unperforated flange being capable of being folded upon the perforated one.

4. An article of manufacture comprising a metal frame, a metal stiffening member having transverse slits to permit same to be bent at an angle to its longitudinal axis, prongs punched from the body of said member leaving punched openings adjacent said prongs, attaching devices extending through said openings into said metal frame and a fabric molding enveloping said stiffening device and perforated by said prongs.

5. In a device of the character described the combination of a metal frame with a molding of fabric having foldable sides, a stiffening member inserted within the fabric, having a series of openings extending along its length, the metal frame having openings that register with said first mentioned openings, fastening elements passing through said openings and said stiffening member being of such flexible character as to permit it to be bent along its longitudinal axis for bringing the foldable sides of the molding into folded position thereby concealing said openings.

6. A combined molding and securing strip for vehicle trimming material comprising a continuous metal strip having two projecting sides; a molding fabric covering said strip and extending over the outer edge of one of said sides, the other of said sides having a series of prongs punched therefrom adapted to pierce and be clinched over the trimming material along one edge thereof, the openings thus formed by punching out the prongs serving to receive fastening devices therethrough for securing the trimming in place, said first named side being thereafter foldable over to conceal said openings and fastening devices.

7. As an article of manufacture a molding comprising an elongated stiffening member of sheet metal having two projecting flanges and both flanges being slitted transversely to permit transverse bending of said member; a molding fabric covering said member and extending over the outer edge of one of said flanges, the other of said flanges having openings punched therein for the insertion of fastening devices, the unperforated flange being adapted to be folded over said other flange to conceal said openings and fastening devices after insertion therein.

In witness whereof, I hereunto subscribe my name.

JOEL D. BOLENDER.